(12) United States Patent
Armstrong

(10) Patent No.: US 7,254,898 B1
(45) Date of Patent: Aug. 14, 2007

(54) MULTI-PURPOSE SPEED SQUARE

(76) Inventor: Kevin G. Armstrong, 110 Hummingbird Lane, RR #3, Ashton, ON (CA) K0A 1B0

( * ) Notice: Subject to any disclaimer, the term of this patent is extended or adjusted under 35 U.S.C. 154(b) by 0 days.

(21) Appl. No.: 10/713,966

(22) Filed: Nov. 14, 2003

(51) Int. Cl.
*B43L 7/14* (2006.01)

(52) U.S. Cl. .............................. 33/464; 33/419; 33/421

(58) Field of Classification Search ................. 33/464, 33/418, 419, 421, 427, 452, 465, 468, 469, 33/470, 471, 472, 473
See application file for complete search history.

(56) References Cited

U.S. PATENT DOCUMENTS

| | | | | |
|---|---|---|---|---|
| 207,494 A | * | 8/1878 | Dunlap | 33/419 |
| 223,727 A | * | 1/1880 | Halley | 33/419 |
| 282,560 A | * | 8/1883 | Overend | 33/473 |
| 683,247 A | * | 9/1901 | Carter | 33/427 |
| 753,025 A | * | 2/1904 | Woodborough | 33/472 |
| 823,444 A | * | 6/1906 | Sassaman | 33/473 |
| 824,134 A | * | 6/1906 | McLeod | 33/419 |
| 1,255,158 A | * | 2/1918 | Gronager | 33/419 |
| 1,268,230 A | * | 6/1918 | Frazier | 33/473 |
| 4,404,753 A | | 9/1983 | Klok | |
| 4,503,624 A | | 3/1985 | Whiteford | |
| 4,525,933 A | * | 7/1985 | Patterson | 33/470 |
| 5,226,238 A | * | 7/1993 | Rahnefeld | 33/419 |
| 5,253,426 A | | 10/1993 | Mosbrucker | |
| 5,813,126 A | | 9/1998 | Dahl | |
| 6,209,213 B1 | | 4/2001 | Moe | |
| D451,831 S | | 12/2001 | Szumer | |

* cited by examiner

Primary Examiner—Christopher W Fulton

(57) ABSTRACT

A multi-purpose framing square has an elongate blade having a T-shaped slot with an L-shape at the base of the T-shaped slot. A handle has a top end has a handle thumbscrew hole. The handle is boltably attached through the handle thumbscrew hole to the blade through the blade T-shaped slot. The handle has a handle cavity through which the blade can move. A handle support pin is detachably connectable to the handle.

20 Claims, 3 Drawing Sheets

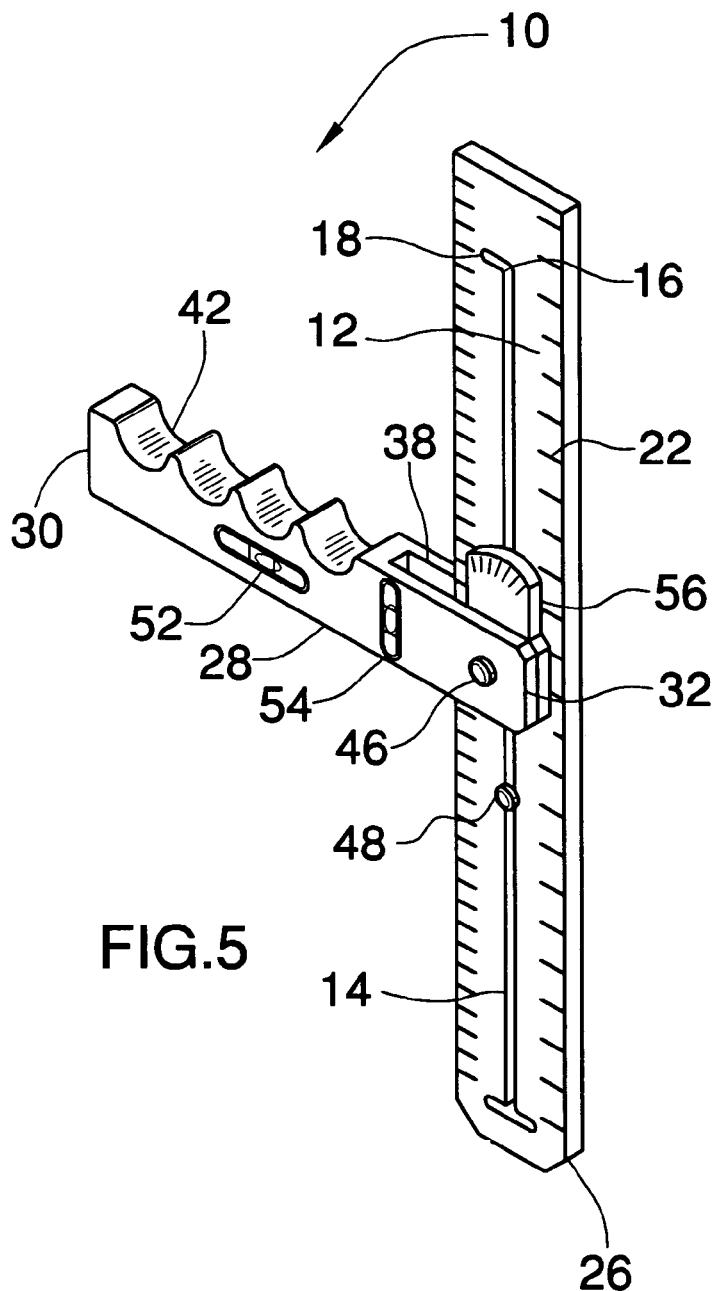
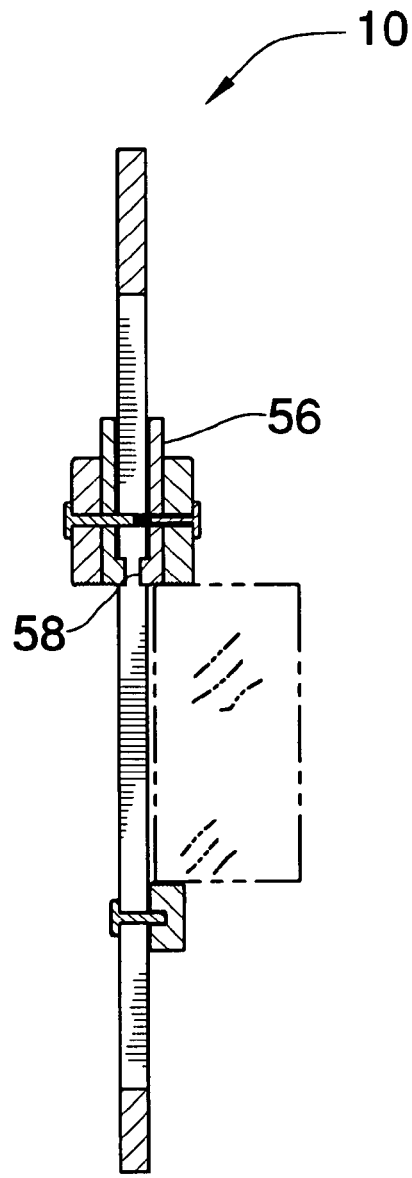
FIG.5
FIG.6

MULTI-PURPOSE SPEED SQUARE

BACKGROUND OF THE INVENTION

1. Field of the Invention

The present embodiment of the invention relates to a multi-purpose framing square for use in connection with carpentry framing squares. The multi-purpose framing square has particular utility in connection with multi-purpose framing squares that have handle support pins and angle lock pins.

2. Description of the Prior Art

Multi-purpose framing squares are desirable for use in carpentry to make right angle markings on wood. The multi-purpose framing square, such as the popular Swanson SPEED SQUARE, combines the features of the traditional framing square along with tri, mitre and protractor squares. A need was felt for a multi-purpose framing square that could be locked at a specific angle, had a handle support, could be used both by left handed users and right handed users and that could be easily adjusted for inside or outside edges.

The use of carpentry framing squares is known in the prior art. For example, U.S. Pat. No. 4,503,624 to Whiteford discloses a combination square, scribing tool and plumb level is basically a carpenter's square in which an elongate blade is connected perpendicularly to an elongate handle. The blade has measuring scales on opposite edges each of which commence at the adjacent edge of the handle, and lines extend across the blade to permit easy visual alignment of both scales. Elongate apertures are formed along each line to facilitate use of the square as a scribing tool. The handle is a clear plastic hollow shell which is substantially filled with a liquid except for a small bubble so that the handle can function as a plumb level. However, the Whiteford '624 patent does not have a movable handle support pin, an angle lock pin, a handle that can be angularly adjusted on either side of the blade and does not have handle finger grips.

Similarly, U.S. Pat. No. 5,813,126 to Dahl discloses a Framing square extension bar and saw guide having a channel extending longitudinally through an extension bar snugly but slidably receives the base flange of a framing square. The extension bar can be locked in a desired position relative to the square, and has mechanism for mounting a stop peg at a desired position along the length of the bar. The position of the square relative to a board to be marked or cut is set by engaging the stop peg against the end of the board while the extension bar is held flush against a longitudinal edge of the board. Each of several different boards can be marked at a predetermined desired length and/or an edge of the framing square can be used as a guide fence for a portable power saw. However, the Dahl '126 patent does not have a movable handle support pin, an angle lock pin, a handle that can be angularly adjusted on either side of the blade and does not have handle finger grips.

Further, United States Patent Number Des. 451,831 to Szumer discloses a carpenter square that has angular markings thereupon. However, the Szumer '831 patent does not have a movable handle support pin, an angle lock pin, a handle that can be angularly adjusted on either side of the blade and does not have handle finger grips.

Further still, U.S. Pat. No. 5,253,426 to Mosbrucker discloses a multi-purpose square having a handle and two legs that extend away from the handle in the same direction, both perpendicular to the handle. The handle includes a level to allow angular measurements against level, as well as for plumbing and leveling purposes. The legs correspond in width to standard dimensions of construction materials to facilitate the measuring and marking of those dimensions on materials. One leg is marked along its edges with linear and angular measurement marks for measuring and marking lines and angles, and has holes disposed selectively along its length for receiving a marker, such as a carpentry pencil. The other leg is marked with angular measurement marks along its edges and has a window with pitch marks along the edges thereof to facilitate the measurement and marking of angles and pitch. However, the Mosbrucker '426 patent does not have a movable handle support pin, an angle lock pin, a handle that can be angularly adjusted on either side of the blade and does not have handle finger grips.

Yet further still, U.S. Pat. No. 6,209,213 to Moe discloses a multi-purpose measuring tool has an elongate base and arm pivotally connected at rounded ends thereof in an angularly variable relation to perform multiple functions, including measuring inclines, measuring corner angles, measuring distances, use as a square, use as a bevel gauge and use as a torpedo level. A retractable measuring tape housed within the arm has a terminal finger gripping end adapted to be pulled away from the arm and removably attached to a distal end of the base. The measuring tape is dual purpose in that one side of the tape is used for determining the angle of the arm relative to the base to perform some of the above functions, and the other side of the tape is used for traditional linear distance measurements. The tool's base includes a "vertical" bubble level and the arm includes a "horizontal" bubble level to perform some of the above functions. However, the Moe '213 patent does not have a movable handle support pin, an angle lock pin, a handle that can be angularly adjusted on either side of the blade and does not have handle finger grips.

Lastly, U.S. Pat. No. 4,404,753 to Klok discloses a lightweight portable carpenter's saw guide and square that singularly performs the functions of triangle, ruler, square, protractor, and leveling device. The special protractor function allows for continuous same plane usage in order to scribe material or to guide a power saw across a given material. However, the Klok '753 patent does not have a movable handle support pin, an angle lock pin, a handle that can be angularly adjusted on either side of the blade and does not have handle finger grips.

While the above-described devices fulfill their respective, particular objectives and requirements, the aforementioned patents do not describe a multi-purpose framing square that allows multi-purpose framing squares that have handle support pins and angle lock pins. The Whiteford '624, Dahl '126, Szumer '831, Mosbrucker '426, Moe '213 and Klok '753 patents make no provision for a movable handle support pin, an angle lock pin, a handle that can be angularly adjusted on either side of the blade and do not have handle finger grips.

Therefore, a need exists for a new and improved multi-purpose framing square which can be used for multi-purpose framing squares that have handle support pins and angle lock pins. In this regard, the present embodiment of the invention substantially fulfills this need.

In this respect, the multi-purpose framing square according to the present embodiment of the invention substantially departs from the conventional concepts and designs of the prior art, and in doing so provides an apparatus primarily developed for the purpose of multi-purpose framing squares that have handle support pins and angle lock pins.

SUMMARY OF THE INVENTION

In view of the foregoing disadvantages inherent in the known types of carpentry framing squares now present in the prior art, the present embodiment of the invention provides an improved multi-purpose framing square, and overcomes the above-mentioned disadvantages and drawbacks of the prior art. As such, the general purpose of the present embodiment of the invention, which will be described subsequently in greater detail, is to provide a new and improved multi-purpose framing square and method which has all the advantages of the prior art mentioned heretofore and many novel features that result in a multi-purpose framing square which is not anticipated, rendered obvious, suggested, or even implied by the prior art, either alone or in any combination thereof.

To attain this, the present embodiment of the invention essentially comprises an elongate blade having a T-shaped slot with an L-shape at the base of the T-shaped slot. A handle has a top end has a handle thumbscrew hole. The handle is boltably attached through the handle thumbscrew hole to the blade through the blade T-shaped slot. The handle has a handle cavity through which the blade can move. A handle support pin is detachably connectable to the handle.

There has thus been outlined, rather broadly, the more important features of the embodiment of the invention in order that the detailed description thereof that follows may be better understood and in order that the present contribution to the art may be better appreciated.

The present embodiment of the invention may also include a handle thumbscrew, a lock pin, a horizontal level, a vertical level and an angle plate. There are, of course, additional features of the present embodiment of the invention that will be described hereinafter and which will form the subject matter of the claims attached.

Numerous objects, features and advantages of the present embodiment of the invention will be readily apparent to those of ordinary skill in the art upon a reading of the following detailed description of presently preferred, but nonetheless illustrative, embodiments of the present embodiment of the invention when taken in conjunction with the accompanying drawings. In this respect, before explaining the current embodiment of the embodiment of the invention in detail, it is to be understood that the embodiment of the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present embodiment of the invention.

It is therefore an object of the present embodiment of the invention to provide a new and improved multi-purpose framing square that has all of the advantages of the prior art carpentry framing squares and none of the disadvantages.

It is another object of the present embodiment of the invention to provide a new and improved multi-purpose framing square that may be easily and efficiently manufactured and marketed.

An even further object of the present embodiment of the invention is to provide a new and improved multi-purpose framing square that has a low cost of manufacture with regard to both materials and labor, and which accordingly is then susceptible of low prices of sale to the consuming public, thereby making such multi-purpose framing square economically available to the buying public.

Still another object of the present embodiment of the invention is to provide a new multi-purpose framing square that provides in the apparatuses and methods of the prior art some of the advantages thereof, while simultaneously overcoming some of the disadvantages normally associated therewith.

Even still another object of the present embodiment of the invention is to provide a multi-purpose framing square that has handle support pins.

Still yet another object of the present embodiment of the invention is to provide a multi-purpose framing square that has angle lock pins.

Further still another object of the present embodiment of the invention is to provide a multi-purpose framing square that has individual handle finger grips.

Lastly, it is an object of the present embodiment of the invention is to provide a multi-purpose framing square that has a handle that can be angularly adjusted on either side of the blade.

These together with other objects of the embodiment of the invention, along with the various features of novelty that characterize the embodiment of the invention, are pointed out with particularity in the claims annexed to and forming a part of this disclosure. For a better understanding of the embodiment of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The embodiment of the invention will be better understood and objects other than those set forth above will become apparent when consideration is given to the following detailed description thereof. Such description makes reference to the annexed drawings wherein:

FIG. 5 is a top perspective view of the multi-purpose framing square of the present embodiment of the invention.

FIG. 6 is a section view of the multi-purpose framing square of the present embodiment of the invention.

The same reference numerals refer to the same parts throughout the various figures.

DESCRIPTION OF THE PREFERRED EMBODIMENT

Figure 1:
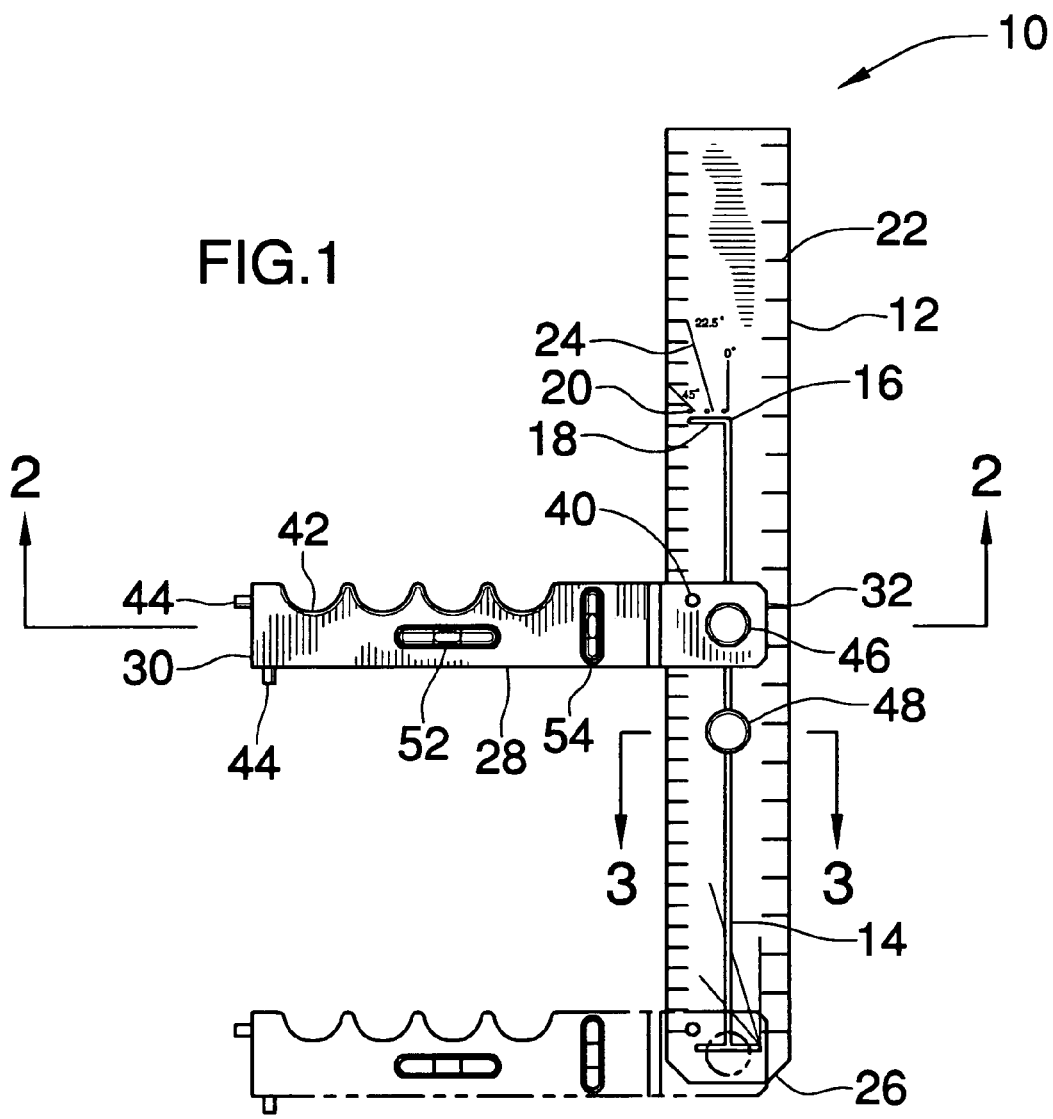
FIG. 1 is a front side view of the preferred embodiment of the multi-purpose framing square constructed in accordance with the principles of the present invention.

Referring now to the drawings, and particularly to FIGS. 1-6, a preferred embodiment of the multi-purpose framing square of the present invention is shown and generally designated by the reference numeral 10.

In FIG. 1, a new and improved multi-purpose framing square 10 of the present invention for multi-purpose framing squares that have handle support pins and angle lock pins is illustrated and will be described. More particularly, the multi-purpose framing square 10 has an elongate blade 12 that has a T-shaped slot 14 therethrough. The handle T-shaped slot 14 has a base 16. The T-shaped slot 14 has an L-shape 18 at the base 16 of the T-shaped slot 14. The blade 12 has a blade angular lock pin hole 20 therethrough. The blade 12 a dimension indicia 22 thereupon. The blade has an angular indicia 24 thereupon. The blade 12 has a bevel 26 adjacent to the blade T-shaped slot 14. A handle 28 has two opposite ends, a bottom end 30 and a top end 32. The handle top end 32 has a handle thumbscrew hole 34 therethrough. The handle 28 is boltably attached through the handle thumbscrew hole 34 to the blade 12 through the blade T-shaped slot 14. The handle bottom end 30 has a handle support pin bore 36 therein. The handle 28 has a handle cavity 38 (shown in FIG. 2) through which the blade 12 can move. The handle top end 32 has a handle lock pin hole 40 therethrough. The handle 28 has a set of four finger grip recesses 42 therein. A handle support pin 44 is detachably connectable to the handle 28. The handle support pin 44 is disposable within the handle support pin bore 36 (shown in FIG. 2). A handle thumbscrew 46 is detachably connectable to the handle 28. The handle thumbscrew 46 is disposed within the handle thumbscrew hole 34. The handle thumbscrew 46 is disposed within the blade T-shaped slot 14. A blade thumbscrew clamp 48 is detachably connectable to the blade 12. The blade thumbscrew clamp 48 disposed within the blade T-shaped slot 14. A lock pin 50 is detachably disposed within the handle lock pin hole 40. The lock pin 50 is detachably disposed within the blade angular lock pin hole 20. A horizontal bubble level 52 is connected to the handle 28. A vertical bubble level 54 is connected to the handle 28.

Figure 2:
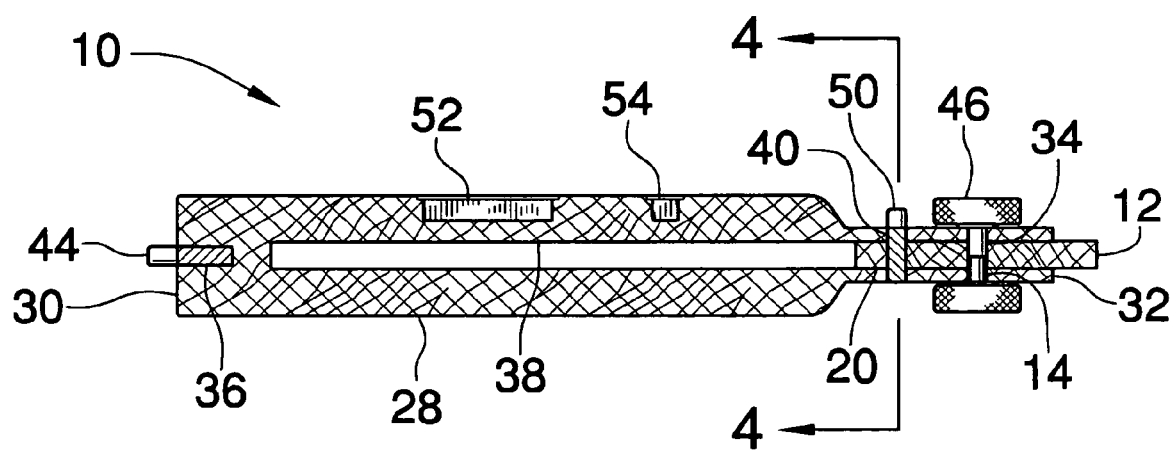
FIG. 2 is a section 2-2 view of FIG. 1 of the multi-purpose framing square of the present embodiment of the invention.

In FIG. 2, the multi-purpose framing square 10 is illustrated and will be described. More particularly, the multi-purpose framing square 10 has the elongate blade 12 that has the T-shaped slot 14 therethrough (shown in FIG. 1). The handle 28 has two opposite ends, the bottom end 30 and the top end 32. The handle top end 32 has the handle thumbscrew hole 34 therethrough. The handle 28 is boltably attached through the handle thumbscrew hole 34 to the blade 12 through the blade T-shaped slot 14. The handle bottom end 30 has the handle support pin bore 36 therein. The handle 28 has the handle cavity 38 through which the blade 12 can move. The handle top end 32 has the handle lock pin hole 40 therethrough. The handle support pin 44 is detachably connectable to the handle 28. The handle support pin 44 is disposable within the handle support pin bore 36. The handle thumbscrew 46 is detachably connectable to the handle 28. The handle thumbscrew 46 is disposed within the handle thumbscrew hole 34. The handle thumbscrew 46 is disposed within the blade T-shaped slot 14. The lock pin 50 is detachably disposed within the handle lock pin hole 40 (shown in FIG. 1). The lock pin 50 is detachably disposed within the blade angular lock pin hole 20 (shown in FIG. 1).

Figure 3:
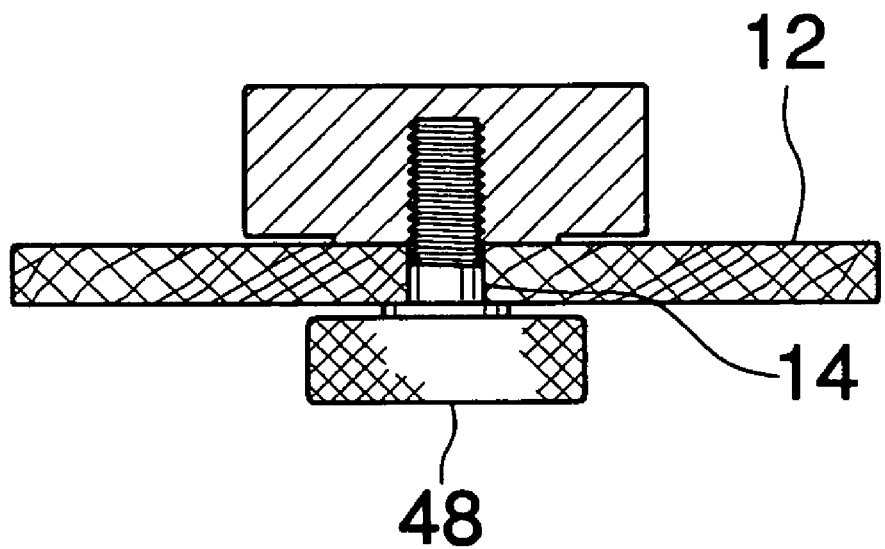
FIG. 3 is a section 3-3 view of FIG. 1 of the multi-purpose framing square of the present embodiment of the invention.

In FIG. 3, the multi-purpose framing square 10 is illustrated and will be described. More particularly, the multi-purpose framing square 10 has the elongate blade 12 that has the T-shaped slot 14 therethrough. The blade thumbscrew clamp 48 is detachably connectable to the blade 12. The blade thumbscrew clamp 48 disposed within the blade T-shaped slot 14.

Figure 4:
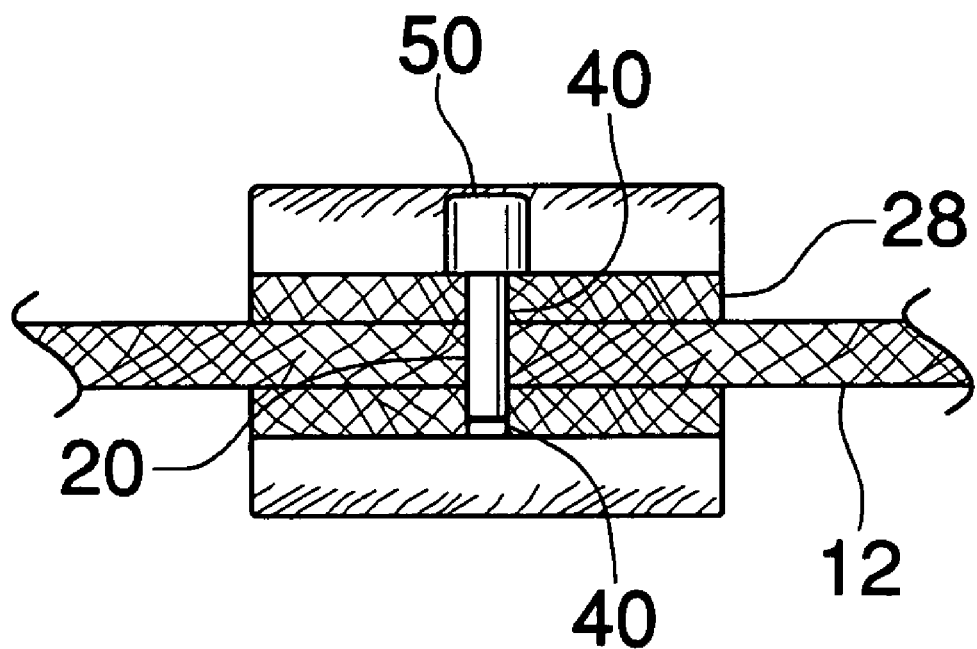
FIG. 4 is a section 4-4 view of FIG. 2 of the multi-purpose framing square of the present embodiment of the invention.

In FIG. 4, the multi-purpose framing square 10 is illustrated and will be described. More particularly, the multi-purpose framing square 10 has the elongate blade 12. The lock pin 50 is detachably disposed within the handle lock pin hole 40. The lock pin 50 is detachably disposed within the blade angular lock pin hole 20.

In FIG. 5, the multi-purpose framing square 10 is illustrated and will be described. More particularly, the multi-purpose framing square 10 has the elongate blade 12 that has the T-shaped slot 14 therethrough. The handle T-shaped slot 14 has the base 16. The T-shaped slot 14 has the L-shape 18 at the base 16 of the T-shaped slot 14. The blade 12 is beveled 26 adjacent to the blade T-shaped slot 14. The handle 28 has two opposite ends, the bottom end 30 and the top end 32. The handle top end 32 has the handle thumbscrew hole 34 therethrough. The handle 28 is boltably attached through the handle thumbscrew hole 34 to the blade 12 through the blade T-shaped slot 14. The handle 28 has the handle cavity 38 through which the blade 12 can move. The handle 28 has four finger grip recesses 42 therein. The handle thumbscrew 46 is detachably connectable to the handle 28. The handle thumbscrew 46 is disposed within the handle thumbscrew hole 34. The handle thumbscrew 46 is disposed within the blade T-shaped slot 14. The blade thumbscrew clamp 48 is detachably connectable to the blade 12. The blade thumbscrew clamp 48 disposed within the blade T-shaped slot 14. The horizontal bubble level 52 is connected to the handle 28. The vertical bubble level 54 is connected to the handle 28. The angle plate 56 is disposed between the handle 28 and the blade 12. The angle plate 56 has an angle plate tang 58 (shown in FIG. 6) which is slidably disposed within the blade T-shaped slot 14.

In FIG. 5, the multi-purpose framing square 10 is illustrated and will be described. More particularly, the multi-purpose framing square 10 has the elongate blade 12 that has the T-shaped slot 14 therethrough. The handle top end 32 has the handle thumbscrew hole 34 therethrough. The handle 28 is boltably attached through the handle thumbscrew hole 34 to the blade 12 through the blade T-shaped slot 14. The handle thumbscrew 46 is detachably connectable to the handle 28. The handle thumbscrew 46 is disposed within the handle thumbscrew hole 34. The handle thumbscrew 46 is disposed within the blade T-shaped slot 14. The blade thumbscrew clamp 48 is detachably connectable to the blade 12. The blade thumbscrew clamp 48 disposed within the blade T-shaped slot 14. The angle plate 56 is disposed between the handle 28 and the blade 12. The angle plate 56 has the angle plate tang 58 which is slidably disposed within the blade T-shaped slot 14.

While a preferred embodiment of the multi-purpose framing square has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present embodiment of the invention. For example, any suitable sturdy material such as wood or plastic may be used instead of the steel blade and handle described. And although multi-purpose framing squares that have handle support pins and angle lock pins have been described, it should be appreciated that the multi-purpose framing square herein described is also suitable for any angular marking.

Therefore, the foregoing is considered as illustrative only of the principles of the embodiment of the invention. Further, since numerous modifications and changes will readily occur to those skilled in the art, it is not desired to limit the embodiment of the invention to the exact construction and operation shown and described, and accordingly, all suitable modifications and equivalents may be resorted to, falling within the scope of the embodiment of the invention.

I claim:

1. A multi-purpose framing square comprising:
   an elongate blade having a T-shaped slot therethrough, said T-shaped slot having a base, said T-shaped slot having an L-shape at the base of said T-shaped slot;
   a handle having two opposite ends, a bottom end and a top end, said handle top end having a handle thumbscrew hole therethrough, said handle being boltably attached through said handle thumbscrew hole to said blade through said blade T-shaped slot, said handle bottom end having a handle support pin bore therein, said handle having a handle cavity through which said blade can move; and
   a handle support pin detachably connectable to said handle, said handle support pin disposable within said handle support pin bore.

2. The multi-purpose framing square of claim 1 further comprising:
   a handle thumbscrew detachably connectable to said handle, said handle thumbscrew disposed within said handle thumbscrew hole, said handle thumbscrew disposed within said blade T-shaped slot.

3. The multi-purpose framing square of claim 1 further comprising:
   a blade thumbscrew clamp detachably connectable to said blade, said blade thumbscrew clamp disposed within said blade T-shaped slot.

4. The multi-purpose framing square of claim 1 further comprising:
   wherein said handle top end having a handle lock pin hole therethrough;
   wherein said blade having a blade angular lock pin hole therethrough; and
   a lock pin detachably disposed within said handle lock pin hole, said lock pin detachably disposed within said blade angular lock pin hole.

5. The multi-purpose framing square of claim 1 wherein: said handle having four finger grip recesses therein.

6. The multi-purpose framing square of claim 1 further comprising:
   a horizontal bubble level connected to said handle.

7. The multi-purpose framing square of claim 1 further comprising:
   a vertical bubble level connected to said handle.

8. The multi-purpose framing square of claim 1 wherein: said blade having dimension indicia thereupon.

9. The multi-purpose framing square of claim 1 wherein: said blade having angular indicia thereupon.

10. The multi-purpose framing square of claim 1 wherein: said blade is beveled adjacent to said blade T-shaped slot.

11. The multi-purpose framing square of claim 1 further comprising:
    an angle plate disposed between said handle and said blade, said angle plate having an angle plate tang which is slidably disposed within said blade T-shaped slot.

12. A multi-purpose framing square comprising:
    an elongate blade having a T-shaped slot therethrough, said T-shaped slot having a base, said T-shaped slot having an L-shape at the base of said T-shaped slot;
    a handle having two opposite ends, a bottom end and a top end, said handle top end having a handle thumbscrew hole therethrough, said handle being boltably attached through said handle thumbscrew hole to said blade through said blade T-shaped slot, said handle bottom end having a handle support pin bore therein, said handle having a handle cavity through which said blade can move;
    a handle support pin detachably connectable to said handle, said handle support pin disposable within said handle support pin bore;
    a handle thumbscrew detachably connectable to said handle, said handle thumbscrew disposed within said handle thumbscrew hole, said handle thumbscrew disposed within said blade T-shaped slot; and
    a blade thumbscrew clamp detachably connectable to said blade, said blade thumbscrew clamp disposed within said blade T-shaped slot.

13. The multi-purpose framing square of claim 12 further comprising:
    wherein said handle top end having a handle lock pin hole therethrough;
    wherein said blade having a blade angular lock pin hole therethrough; and
    a lock pin detachably disposed within said handle lock pin hole, said lock pin detachably disposed within said blade angular lock pin hole.

14. The multi-purpose framing square of claim 13 wherein:
    said handle having four finger grip recesses therein.

15. The multi-purpose framing square of claim 14 further comprising:
    a horizontal bubble level connected to said handle; and
    a vertical bubble level connected to said handle.

16. The multi-purpose framing square of claim 15 wherein:
    said blade having dimension indicia thereupon.

17. The multi-purpose framing square of claim 16 wherein:
    said blade having angular indicia thereupon.

18. The multi-purpose framing square of claim 17 wherein:
    said blade is beveled adjacent to said blade T-shaped slot.

19. The multi-purpose framing square of claim 18 further comprising:
    an angle plate disposed between said handle and said blade, said angle plate having an angle plate tang which is slidably disposed within said blade T-shaped slot.

20. A multi-purpose framing square comprising:
    an elongate blade having a T-shaped slot therethrough, said T-shaped slot having a base, said T-shaped slot having an L-shape at the base of said T-shaped slot, said blade having a blade angular lock pin hole therethrough, said blade having dimension indicia thereupon, said blade having angular indicia thereupon, said blade is beveled adjacent to said blade T-shaped slot;
    a handle having two opposite ends, a bottom end and a top end, said handle top end having a handle thumbscrew hole therethrough, said handle being boltably attached through said handle thumbscrew hole to said blade through said blade T-shaped slot, said handle bottom end having a handle support pin bore therein, said handle having a handle cavity through which said blade can move, said handle top end having a handle lock pin hole therethrough, said handle having four finger grip recesses therein;

a handle support pin detachably connectable to said handle, said handle support pin disposable within said handle support pin bore;

a handle thumbscrew detachably connectable to said handle, said handle thumbscrew disposed within said handle thumbscrew hole, said handle thumbscrew disposed within said blade T-shaped slot;

a blade thumbscrew clamp detachably connectable to said blade, said blade thumbscrew clamp disposed within said blade T-shaped slot;

a lock pin detachably disposed within said handle lock pin hole, said lock pin detachably disposed within said blade angular lock pin hole;

a horizontal bubble level connected to said handle; and a vertical bubble level connected to said handle.

* * * * *